United States Patent [19]
Ozaki

[11] 3,964,330
[45] June 22, 1976

[54] CHAIN GUIDE CONNECTOR DEVICE FOR USE IN BICYCLE DERAILLEURS

[75] Inventor: Nobuo Ozaki, Sakai, Japan

[73] Assignee: Maeda Industries, Ltd., Osaka, Japan

[22] Filed: Nov. 8, 1974

[21] Appl. No.: 522,125

[52] U.S. Cl. .............................. 74/240; 74/217 B; 74/611
[51] Int. Cl.² ........................ F16H 7/22; F16H 7/18
[58] Field of Search................ 74/217 B, 242.11 B, 74/242.14 B, 242.15 B, 611, 240

[56] References Cited
UNITED STATES PATENTS
3,184,993  5/1965  Swenson .............................. 74/611

OTHER PUBLICATIONS
Wheel Goods Corp., "The Handbook of Cycl–ology," 1973, 6th edition, p. 56.

Primary Examiner—Samuel Scott
Assistant Examiner—A. Russell Burke
Attorney, Agent, or Firm—Stewart and Kolasch, Ltd.

[57] ABSTRACT

In a protective device to be incorporated in a bicycle rear derailleur for preventing a drive chain from being unexpectedly disengaged with the smallest sprocket wheel, the device has an internally threaded cylindrical portion and a substantially flat flange portion extending integrally from one end of said cylindrical portion, said cylindrical portion being screwable, in place of a lock nut, onto a standard mounting bolt which is employed in the known rear derailleurs for connecting a shifter body to a hook-shaped bracket; said flange portion being designed so that it extends, when incorporated with the rear derailleur, in parallel and slightly spaced with the opposite surface of the smallest sprocket wheel of a multi-stage freel wheel assembly; and by means of the smooth outer surface of said flange portion a desired chain fall prevention is attained.

7 Claims, 9 Drawing Figures

CHAIN GUIDE CONNECTOR DEVICE FOR USE IN BICYCLE DEVAILLEURS

BACKGROUND AND SUMMARY OF INVENTION

The present invention relates to a protective device for use in bicycles, and more particularly to an improvement in the device to be incorporated in a rear derailleur of bicycles for preventing a drive chain from being disengaged with the smallest sprocket wheel of a multi-stage free wheel assembly.

In a multi-speed type of bicycle equipped with a multi-stage free wheel assembly externally installed on one end of a rear wheel spindle and a rear derailleur cooperatively connected to said free wheel assembly, it is well known in the field that a running chain is inclined to be unexpectedly disengaged from the smallest sprocket wheel (top gear) of the free wheel assembly when the chain is shifted from a lower gear to the top gear, viz. from a larger sprocket wheel to the smallest one under the swing function of the rear derailleur. In case the drive chain is unexpectedly disengaged during cycling, it, as a matter of course, causes interference with or stopping the cycling and sometimes may happen to bring about a serious accident.

In avoiding this deficiency, it has been apparent to those skilled in the art that provision of a proper protective device in place near the outward surface of the smallest sprocket wheel is effective. Nevertheless, most of conventional bicycles were not equipped with such protective device. However, several kinds of such protective devices including a finger type, a nail type, a hook type and the like have recently been proposed. And among them, some are proposed in the form of a separately-made part to be fixedly secured to a suitable position of a shifter body or its vicinity of the rear derailleur by means of one or more mounting screws, while others are proposed in the form of an integral part which offsets from a certain portion of the shifter body, a pulley cage or the like of the derailleur. However, such conventional protective devices are designed for only use in a specific derailleur of one manufacturer and cannot be applicable to a derailleur provided by other manufacturers. Therefore, the conventional protective devices are not available to those bicycles which have been delivered to users without any protective device. Further, since some of the conventional devices are rather intricate in configuration, it is not always easy to incorporate with the rear derailleur during manufacturing process, and position adjustment is usually required so that a chain fall restricting surface of the device may face effectively in one direction because those devices are not synmetrical in confiiguration. Still further, most of the conventional devices are not always easy to manufacture and do not permit a very low expense owing to a specific configuration thereof. Yet further, the conventional protective devices are not easy to exchange when they are broken or damaged.

The present invention contemplates over known types of the protective devices. According to the present invention, the protective device is formed to be of most simple configuration, wherein a cylindrical portion and a substantially flat flange portion extending integrally from one end of said cylindrical portion are provided, said cylindrical portion being internally threaded so as to be screwable, in place of a known lock nut, onto a mounting bolt which is inserted through a shifter body and a hook-shaped bracket, both known elements of the conventional rear derailleur, and the smooth outer surface of said flange portion being designed to perform a desired prevention of the drive chain from disengagement with the smallest sprocket wheel. The protective device according to the present invention is employed in place of a mounting nut which has been conventionally screwed on said mounting bolt for locking the shifter body to the hook-shaped bracket together. In other words, the protective device according to the present invention performs a mounting function as well as a chain fall preventing function, and therefore, the mounting nut which has been hithertofore required is no longer necessary.

Therefore, it is an object of the present invention is to provide the simplest type of protective device for preventing a drive chain from being disengaged from the smallest sprocket wheel.

Another object of the invention is to provide an improved protective device which can be easily incorporated with most of known type rear derailleurs.

A further object of the invention is to provide an improved protective device which permits a very low manufacturing cost.

The above and other objects, features and advantages of the present invention will become more apparent from the following description of some of the preferred embodiments thereof taken in conjunction with the accompanying drawing.

BRIEF DESCRIPTION OF THE DRAWING

The present invention will become more fully understood from the detailed description given hereinbelow and the accompanying drawing which is given by way of illustration only, and thus is not limitative of the present invention and wherein.

DESCRIPTION OF THE PREFERRED EMBODIMENTS

Figure 1:
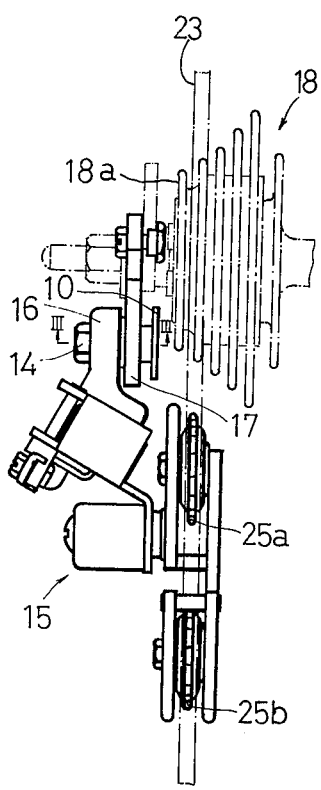
FIG. 1 is a somewhat schematic side elevation of a typical bicycle rear derailleur, in which a protective device according to the present invention is incorporated therewith.
Figure 2:
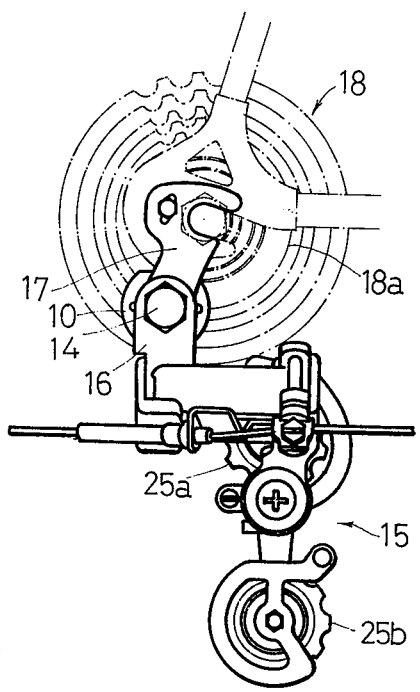
FIG. 2 is a front elevation of the derailleur illustrated in FIG. 1.
Figure 3:
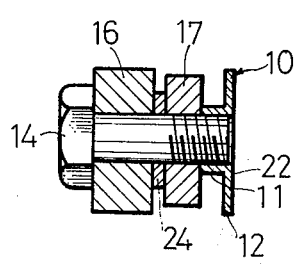
FIG. 3 is an enlarged sectional end view taken on lines III—III of FIG. 1.
Figure 4:
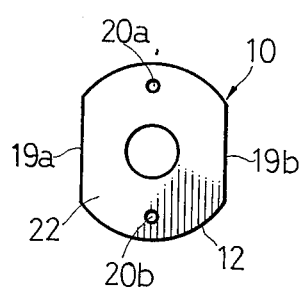
FIG. 4 is a front elevational view of one example of protective device according to the present invention.
Figure 5:
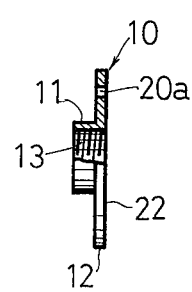
FIG. 5 is a side elevational view of the protective device shown in FIG. 4, with part broken away.
Figure 6:
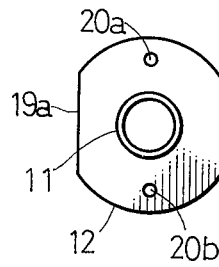
FIG. 6 is a rear elevational view of the device shown in FIG. 4.
Figure 7:
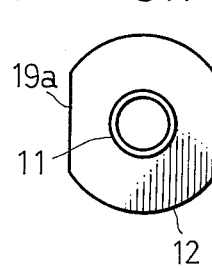
FIG. 7 is a rear elevational view of a modified embodiment according to the present invention.
Figure 8:
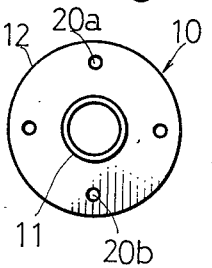
FIG. 8 is a similar view to FIG. 7 illustrating another modified embodiment according to the present invention.
Figure 9:
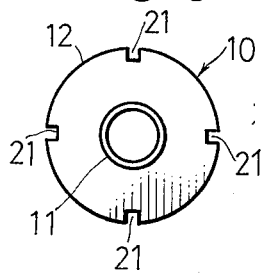
FIG. 9 is a similar view to FIG. 7, showing a further modified embodiment according to the present invention.

Referring now by reference numerals to the drawing, and in particular to FIGS. 1 to 9, the protective device which is generally designated by reference numeral 10 is made of metal and has an internally threaded cylindrical portion 11 and a substantially flat flange portion 12 extending integrally from one end of said cylindrical portion 11. The internal thread 13 of said cylindrical portion 11 is cut so that the portion 11 is screwable to a standard mounting bolt 14 which is employed in almost all the known rear derailleurs 15 for connecting a shifter body 16 to a hook-shaped bracket 17 in the manner that the derailleur 15 can cooperate with a multi-stage free wheel assembly 18 for performing bicycle speed change. The flange portion 12 may preferably be provided with a pair of parallel straight edges 19a, 19b and/or at least a pair of small holes 20a, 20b oppositely disposed on a center line of the protective device 10 as particularly shown in FIGS. 4 and 6. Said pair of parallel straight edges 19a, 19b are formed so that an opening or an adjustable jaw of a spanner or a wrench can grip the flange portion 12 at these edges in order to turn the device 10 and screwably mount it on the bolt 14. While, said pair of small holes 20a, 20b are provided in order that a face spanner with a pair of small pins can be applied for turning the device 10 for the same purpose as above. Therefore, when said parallel edges 19a, 19b are formed, said pair of holes 20a, 20b may be omitted as shown in FIG. 7. Otherwise, said parallel edges 19a, 19b may be omitted in case at least one pair of said small holes 20a, 20b are provided, as shown in FIG. 8. Further, instead of said parallel edges or said pair of small holes, a plurality of square notches 21 may be formed with marginal edge of the flange portion 12 so that a hook spanner can be applied for turning the device 10.

Thus, the protective device 10 is easily incorporated in the rear derailleur 15 by screwing it, by means of a suitable spanner or a wrench, onto the threaded end of a standard mounting bolt 14 in place of a lock nut which has hitherto been employed for clamping purpose.

It will be easily understood that the axial length of the cylindrical portion 11 should be defined so that the clearance between the smooth outer surface 22 of the flange portion 12 and the opposite surface of the smallest sprocket wheel 18a is smaller than the width of the drive chain 23 in order to prevent the chain 23 from falling into said clearance. Further, the axial length of the same should also be defined in the manner that it will not allow the threaded end of the mounting bolt 14 to project outwardly from the outer surface 22 of the flange portion 12. However, a desired seat washer (not shown) may be interposed between the hook-shaped bracket 17 and the free end of the cylindrical portion 11 in order to adjust said clearance and to avoid said projection of the bolt 14. Further, the size of the flange portion 12 should be determined in the manner that a certain portion of the outer surface 22 extending in parallel and slightly spaced relation with the opposite surface of the smallest sprocket wheel 18a may always face a certain portion of said opposite surface of said smallest sprocket wheel 18a at whatever angular position the flange portion 12 may finally be clamped when the device 10 is incorporated in the rear derailleur 15 as shown in particular in FIGS. 1 and 2. Incidentally, reference numeral 24 in FIG. 3 denotes a washer which may be employed when desired for preventing the loosening of the clamp.

In operation, when the running chain 23 is shifted from a larger sprocket wheel to the smallest one 18a by the swinging function of pulleys 25a, 25b, the chain 23 is restricted from going over the smallest sprocket wheel 18a by means of the extending smooth outer surface 22 of the flange portion 12, whereby the unexpected chain disengagement during cycling is effectively prevented.

The invention being thus described, it will be obvious that the same may be varied in many ways. Such variations are not to be regarded as a departure from the spirit and scope of the invention, and all such modifications are intended to be included within the scope of the appended claims.

I claim:
1. A protective device for use in bicycles including a rear derailleur containing a shifter body and a hook-shaped bracket and a multi-stage free wheel assembly containing a plurality of sprocket wheels, said protective device comprising
   an internally threaded cylindrical portion and
   a flange portion extending integrally from one end of said cylindrical portion,
   said cylindrical portion being in screw engagement with a mounting bolt which is employed for clamping said shifter body to the hook-shaped bracket in the bicycle rear derailleur,
   said flange portion having a smooth outer surface which extends substantially parallel with the opposite surface of the smallest sprocket wheel of said multi-stage free wheel assembly when the device is incorporated in a rear derailleur, and
   said flange portion having an outer surface which has a sufficient size and shape to prevent the chain of the mutli-stage free wheel assembly from becoming disengaged from the smallest sprocket wheel.
2. The protective device, as set forth in claim 1, wherein
   the axial length of said cylindrical portion is defined so that a distance between said smooth outer surface of the flange portion and an opposite surface of the smallest sprocket wheel of the multi-stage free wheel assembly is smaller than the width of a drive chain when the device is incorporated in a rear derailleur, so that the threaded end of said mounting bolt does not project beyond the smooth outer surface of said flange portion.
3. The protective device, as set forth in claim 1, wherein the size of said flange portion is defined so that at least a certain portion of said outer surface thereof always faces a certain portion of the opposite surface of the smallest sprocket wheel of the multi-stage free wheel assembly at whatever angular position the flange portion may be clamped when the device is incorporated in a rear derailleur.
4. The protective device as set forth in claim 1, wherein said flange portion is formed with at least one engageable means for permitting the turning of the device.
5. The protective device, as set forth in claim 4, wherein
   said engageable means is in the form of at least a pair of parallel straight edges.
6. The protective device, as set forth in claim 4, wherein
   said engageable means is in the form of at least a pair of small holes.
7. The protective device, as set forth in claim 4, wherein
   said engageable means is in the form of at least a pair of square notches.

\* \* \* \* \*